US010259906B2

(12) United States Patent
Kaluschke et al.

(10) Patent No.: US 10,259,906 B2
(45) Date of Patent: Apr. 16, 2019

(54) METHOD FOR PRODUCING POLYURETHANE RIGID FOAMS AND POLYISOCYANURATE RIGID FOAMS

(71) Applicant: BASF SE, Ludwigshafen (DE)

(72) Inventors: Tobias Kaluschke, Dinklage (DE); Gunnar Kampf, Stemwede-Haldem (DE)

(73) Assignee: BASF SE, Ludwigshafen (DE)

( * ) Notice: Subject to any disclaimer, the term of this patent is extended or adjusted under 35 U.S.C. 154(b) by 99 days.

(21) Appl. No.: 15/117,960

(22) PCT Filed: Jan. 27, 2015

(86) PCT No.: PCT/EP2015/051569
§ 371 (c)(1),
(2) Date: Aug. 10, 2016

(87) PCT Pub. No.: WO2015/121057
PCT Pub. Date: Aug. 20, 2015

(65) Prior Publication Data
US 2016/0347904 A1    Dec. 1, 2016

(30) Foreign Application Priority Data

Feb. 11, 2014   (EP) .................................... 14154645

(51) Int. Cl.
| | | |
|---|---|---|
| *C08G 63/672* | (2006.01) |
| *C08G 18/48* | (2006.01) |
| *C08G 18/76* | (2006.01) |
| *C08G 18/40* | (2006.01) |
| *C08G 18/42* | (2006.01) |
| *C08G 63/668* | (2006.01) |
| *C08G 18/08* | (2006.01) |
| *C08G 18/18* | (2006.01) |
| *C08J 9/00* | (2006.01) |
| *C08J 9/14* | (2006.01) |
| *C08G 101/00* | (2006.01) |

(52) U.S. Cl.
CPC .......... *C08G 63/672* (2013.01); *C08G 18/14* (2013.01); *C08G 18/1833* (2013.01); *C08G 18/4018* (2013.01); *C08G 18/4219* (2013.01); *C08G 18/4288* (2013.01); *C08G 18/4825* (2013.01); *C08G 18/4879* (2013.01); *C08G 18/7664* (2013.01); *C08G 18/7671* (2013.01); *C08G 63/668* (2013.01); *C08J 9/0038* (2013.01); *C08J 9/141* (2013.01); *C08G 2101/0025* (2013.01); *C08J 2203/14* (2013.01); *C08J 2375/08* (2013.01)

(58) Field of Classification Search
CPC ........... C08G 18/14; C08G 18/1833; C08G 18/4018; C08G 18/4219; C08G 18/4288; C08G 18/4825; C08G 18/4879; C08G 18/7664; C08G 18/7671; C08G 63/668; C08G 63/672; C08G 2101/0025; C08J 9/0038; C08J 9/141; C08J 2203/14; C08J 2375/08

See application file for complete search history.

(56) References Cited

U.S. PATENT DOCUMENTS

| | | | |
|---|---|---|---|
| 4,529,744 A | * | 7/1985 | Wood ................. C08G 18/3221 252/182.25 |
| 5,051,528 A | | 9/1991 | Naujokas et al. |

(Continued)

FOREIGN PATENT DOCUMENTS

| | | |
|---|---|---|
| DE | 1 003 714 B | 3/1957 |
| WO | WO 2010/043624 A2 | 4/2010 |
| WO | WO 2012/126916 A2 | 9/2012 |

OTHER PUBLICATIONS

International Search Report dated Apr. 8, 2015 in PCT/EP2015/051569.

(Continued)

*Primary Examiner* — John M Cooney
(74) *Attorney, Agent, or Firm* — Oblon, McClelland, Maier & Neustadt, L.L.P.

(57) ABSTRACT

The present invention relates to polyester polyols obtainable or obtained by esterification of 10 to 70 mol % of at least one compound from the group consisting of terephthalic acid (TPA), dimethyl terephthalate (DMT), polyethylene terephthalate (PET), phthalic anhydride (PA), phthalic acid and isophthalic acid, 0.1 to 30 mol % of one or more fatty acids and/or fatty acid derivatives, 10 to 70 mol % of one or more aliphatic or cycloaliphatic diols having 2 to 18 carbon atoms or alkoxylates thereof, 5 to 70 mol % of a polyether polyol prepared by alkoxylating an aromatic starter molecule having a functionality of not less than 2, and of 0 to 70 mol % of a tri- or polyol other than the polyether polyol, all based on the total amount of the components used, wherein the amounts used of the components add up to 100 mol %. The present invention further relates to a process for producing rigid polyurethane or polyisocyanurate foams which comprises reacting an isocyanate component with a polyol component (PK) comprising a polyester polyol of the present invention and further components, to the polyol component as such and also to the rigid polyurethane or polyisocyanurate foams obtainable or obtained by a process of the present invention. The present invention also relates to the method of using a polyester polyol (P1) of the present invention in the manufacture of rigid polyurethane foams or rigid polyisocyanurate foams.

16 Claims, No Drawings

(56) References Cited

U.S. PATENT DOCUMENTS

| | | | |
|---|---|---|---|
| 2002/0010224 A1* | 1/2002 | Wilson | C08G 18/284 |
| | | | 521/114 |
| 2011/0201716 A1 | 8/2011 | Gehinger et al. | |
| 2012/0214891 A1* | 8/2012 | Gehringer | C08G 18/664 |
| | | | 521/172 |

OTHER PUBLICATIONS

International Preliminary Report on Patentability and Written Opinion of the International Searching Authority dated Jan. 29, 2016 in PCT/EP2015/051569 filed Jan. 27, 2015 (with partial English translation).

"Kunststoff-Handbuch Band VII Polyurethane" Carl Hanser Verlag Munich, 1st Edition, 1966, 14 Pages. (submitting table of contents only).

Kunststoff-Handbuch, Band VII, Polyurethane, Carl Hanser Verlag Munich, 2nd Edition, 1983, 15 Pages (submitting table of contents only).

Kuriststoff-Handbuch, Band VII, Polyurethane, Carl Hanser Verlag Munich, 3rd Edition, 1993, 16 Pages (submitting table of contents only).

J.H. Saunders, et al., "High Polymers" Polyurethanes Chemistry and Technology Part 1, Interscience Publishers, vol. XVI, 1962, 1 Page (submitting table of contents only).

J.H. Saunders, et al., "High Polymers" Polyurethanes Chemistry and Technology, Part 2, Interscience Publishers, vol. XVI, 1964, 2 Pages (submitting table of contents only).

* cited by examiner

METHOD FOR PRODUCING POLYURETHANE RIGID FOAMS AND POLYISOCYANURATE RIGID FOAMS

The present invention relates to polyester polyols obtainable or obtained by esterification of 10 to 70 mol % of at least one compound from the group consisting of terephthalic acid (TPA), dimethyl terephthalate (DMT), polyethylene terephthalate (PET), phthalic anhydride (PA), phthalic acid and isophthalic acid, 0.1 to 30 mol % of one or more fatty acids and/or fatty acid derivatives, 10 to 70 mol % of one or more aliphatic or cycloaliphatic diols having 2 to 18 carbon atoms or alkoxylates thereof, 5 to 70 mol % of a polyether polyol prepared by alkoxylating an aromatic starter molecule having a functionality of not less than 2, and of 0 to 70 mol % of a tri- or polyol other than the polyetherpolyol, all based on the total amount of the components used, wherein the amounts used of the components add up to 100 mol %. The present invention further relates to a process for producing rigid polyurethane or polyisocyanurate foams which comprises reacting an isocyanate component with a polyol component (PK) comprising a polyester polyol of the present invention and further components, to the polyol component as such and also to the rigid polyurethane or polyisocyanurate foams obtainable or obtained by a process of the present invention. The present invention also relates to the method of using a polyester polyol (P1) of the present invention in the manufacture of rigid polyurethane foams or rigid polyisocyanurate foams.

The production of rigid polyurethane foams by reaction of organic or modified organic di- or polyisocyanates with comparatively high molecular weight compounds having two or more reactive hydrogen atoms, in particular with polyether polyols from alkylene oxide polymerization or polyester polyols from the polycondensation of alcohols with dicarboxylic acids in the presence of polyurethane catalysts, crosslinking and/or chain-extet ding agents, blowing agents and further auxiliary and admixture agents is known per se and has been described in numerous patent and literature publications.

In the context of the present disclosure, the terms "polyester polyol", "polyesterol", "polyester alcohol" and the abbreviation "PESOL" are used interchangeably.

Customary polyester polyols for production of rigid polyurethane foams are polycondensates of aromatic and/or aliphatic dicarboxylic acids and alkanediois and/or -triols, or ether diols. But it is also possible to process polyester scrap, particularly polyethylene terephthaiate (PET) and/or polybutylene terephthalate (PBT) scrap. A whole series of processes are known and have been described for this purpose. Some processes are based on converting the polyester into a diester of terephthalic acid, for example dimethyl terephthalate. DEA 100 37 14 and U.S. Pat. No. 5,051,528, for example, describe such transesterifications involving the use of methanol and transesterification catalysts.

It is further known that esters based on terephthalic acid are superior in terms of burning behavior to esters based on phthalic acid, as described for example in WO 2010/043624. This property is particularly important in civil engineering where rigid polyurethane and polyisocyanurate foams are used, However, the problem with the behavior of rigid PU foams in the event of fire necessitates ongoing optimization, since the materials are expected to meet ever higher requirements.

The admixture of flame retardants is difficult because the admixture of comparatively large amounts of flame retardants affects the properties of the rigid polyurethane or poiyisocyanurate foam obtained. The problem addressed by the present invention was accordingly that of providing for the production of rigid polyurethane or polyisocyanurate foams suitable reaction components that improve the fire behavior, i.e., the behavior in the event of a fire, of the rigid polyurethane or polyisocyanurate foam produced therewith while at the same time having no adverse effect on the other properties of the rigid foam.

Proceeding from the prior art, the present invention accordingly addressed the problem of providing rigid polyurethane or polyisocyanurate foams having good fire protection properties and good ranges of properties for applications in civil engineering.

The problem addressed by the present invention was further that of providing polyester polyols which are suitable for producing rigid polyurethane or polyisocyanurate foam and optimize the fire behavior, i.e., the behavior in the event of a fire, of the rigid polyurethane or polyisocyanurate foam produced therewith.

The problem is solved according to the present invention by a polyester polyol (P1) obtainable or obtained by esterification of components (i) to (v)
  (i) 10 to 70 mol % of at least one compound fro the group consisting of terephthalic acid (TPA), dimethyl terephthalate (DMT), polyethylene terephthalate (PET), phthalic anhydride (PA), phthalic acid and isophthalic acid,
  (ii) 0.1 to 30 mol % of one or more fatty acids and/or fatty acid derivatives,
  (iii) 10 to 70 mol % of one or more aliphatic or cycloaliphatic dials having 2 to 18 carbon atoms or alkoxylates thereof,
  (iv) 5 to 70 mol % of a polyether polyol prepared by alkoxylating an aromatic starter molecule having a functionality of not less than 2,
  (v) 0 to 70 mol % of a tri- or polyol other than component (iv),
all based on the total amount of components (i) to (v), wherein the amounts used of components (i) to (v) add up to 100 mol %.

According to a further aspect, the present invention also provides a process for producing rigid polyurethane foams or rigid polyisocyanurate foams which comprises the reaction of
  A) a component (A) comprising at least one compound selected from the group consisting of organic diisocyanates, modified organic diisocyanates, organic polyisocyanates and modified organic polyisocyanates, with
  B) a polyol component (PK) comprising
    (b1.1) at least one polyester polyol (P1) as described above,
    (b2) at least one flame retardant,
    (b3) at least one blowing agent,
    (b4) at least one catalyst.

The invention will now be more particularly described. Combinations of preferred embodiments are not outside the scope of the present invention. This applies particularly in respect of those embodiments of the individual components of the present invention that are characterized as preferred. The embodiments recited hereinbelow in he context of components relate not only to the process of the present invention and to the rigid foams thus obtainable but also to the polyester polyols and polyol components of the present invention.

Polyester polyol (PI), which is in accordance with the present invention, is obtainable or obtained by esterification of components (i) to (v). It transpires that, surprisingly, said polyester polyol (PI) of the present invention, or the specific composition of components (i) to (v) in the preparation of said polyester polyol, leads on employing polyetheropolyol (P1) in the manufacture of rigid polyurethane or polyisocyanurate foams to materials having particularly good fire protection properties.

Component (i) therein comprises at least one compound from the group consisting of terephthalic acid (TPA), dimethyl terephthalate (DMT), polyethylene terephthalate (PET), phthalic anhydride (PA), phthalic acid and isophthalic acid, used in an amount from 10 to 70 mol %. Component (ii) comprises one or more fatty acids and/or fatty acid derivatives used in an amount from 0.1 to 30 mol %. Component (iii) comprises one or more aliphatic or cycloaliphatic dials having 2 to 18 carbon atoms or alkoxylates thereof, used in an amount from 10 to 70 mol %. Component (iv) comprises for the purposes of the present invention a polyether polyol prepared by alkoxylating an aromatic starter molecule having a functionality of not less than 2, used in an amount from 5 to 70 mol %. Component (v) lastly comprises a tri- or polyol other than component (iv), used in an amount from 0 to 70 mol %. The amounts are all based on the total amount of components (i) to (v), wherein the amounts used of components (i) to (v) add up to 100 mol %.

In the context of the present invention, the terms "polyester polyol", and "polyesterol" are used interchangeably, as are the terms "polyether polyol" and "polyetherol".

According to the present invention, component (i) is used in an amount from 10 to 70 mol %, based on the total amount of components (i) to (v), wherein the amounts used of components (i) to (v) add up to 100 mol %. The amounts in which component (i) is used are preferably from 15 to 65 mol %, more preferably from 18 to 60 mol %, yet more preferably from 20 to 50 mol % and yet still more preferably from 25 to 40 mol %, all based on the total amount of components (i) to (v) wherein the amounts used of components (i) to (v) add up to 100 mol %.

According to the present invention, component (ii) is used in an amount from 0.1 to 30 mol %, based on the total amount of components (i) to (v), wherein the amounts used of components (i) to (v) add up to 100 mol %. The amounts in which component (ii) is used are preferably from 0.5 to 30 mol %, more preferably from 1 to 25 mol %, yet more preferably from 2 to 20 mol % and yet still more preferably from 3 to 14 mol % and most preferably from 8 to 14 mol %, all based on the total amount of components (i) to (v) wherein the amounts used of components (i) to (v) add up to 100 mol %.

According to the present invention, component (iii) is used in an amount from 10 to 70 mol %, based on the total amount of components (i) to (v), wherein the amounts used of components (i) to (v) add up to 100 mol %. The amounts in which component (iii) is used are preferably from 20 to 60 mol %, more preferably from 25 to 55 mol %, all based on the total amount of components (i) to (v) wherein the amounts used of components (i) to (v) add up to 100 mol %.

According to the present invention, component (iv) is used in an amount from 5 to 70 mol %, based on the total amount of components (i) to (v), wherein the amounts used of components (i) to (v) add up to 100 mol %. The amounts in hich component (iv) is used are preferably from 5 to 60 mol %, more preferably from 5 to 50 mol %, yet more preferably from 10 to 35 mol % and yet still more preferably from 12 to 30 mol % and most preferably from 12 to 18 mol %, all based on the total amount of components (i) to (v) wherein the amounts used of components (i) to (v) add up to 100 mol %.

According to the present invention, component (v) is used in an amount from 0 to 70 mol %, based on the total amount of components (i) to (v), wherein the amounts used of components (i) to (v) add up to 100 mol %. Where component (v) is used, the amounts in which it is used are preferably from 5 to 60 mol %, more preferably from 5 to 50 mol %, yet more preferably from 10 to 35 mol % and yet still more preferably from 12 to 30 mol % and most preferably from 12 to 18 mol %, all based on the total amount of components (i) to (v) wherein the amounts used of components (i) to (v) add up to 10D mol %. According to the present invention, it is also possible to use component (v) in an amount of 0 mol %. In an alternative embodiment, component (v) is used in amounts from 0 to 18 mol %, all based on the total amount of components (i) to (v), wherein the amounts used of components (i) to (v) add up to 100 mol %.

Accordingly, in a further embodiment, the present invention also provides a polyester polyol (P1) obtainable or obtained by esterification of components (i) to (v) as described above, wherein components (i) to (v) are used in the following amounts:
component (i) in an amount from 25 to 40 mol %,
component (ii) in an amount from 8 to 14 mol %,
component (iii) in an amount from 25 to 55 mol %,
component (iv) in an amount from 12 to 18 mol %, and
component (v) in an amount from 0 to 18 mol %,
all based on the total amount of components (i) to (v), wherein the amounts used of components (i) to (v) add up to 100 mol %.

Further, in a further embodiment, the present invention also provides a polyester polyol (P1) obtainable or obtained by esterification of components (i) to (v) as described above, wherein components (i) to (v) are used in the following amounts:
component (i) in an amount from 25 to 40 mol %,
component (ii) in an amount from 8 to 14 mol %,
component (iii) in an amount from 25 to 55 mol %,
component (iv) in an amount from 12 to 18 mol %, and
component (v) in an amount of 0 mol %,
all based on the total amount of components (i) to (v), wherein the amounts used of components (i) to (v) add up to 100 mol %.

In an alternative embodiment, the present invention also provides a polyester polyol (P1) obtainable or obtained by esterification of components (i) to (v) as described above, wherein components (i) to (v) are used in the following amounts:
component (i) in an amount from 25 to 40 mol %,
component (ii) in an amount from 8 to 14 mol %,
component (iii) in an amount from 25 to 55 mol %,
component (iv) in an amount from 12 to 18 mol %, and
component (v) in an amount from 12 to 18 mol %,
all based on the total amount of components (i) to (v), herein the amounts used of components (i) to (v) add up to 100 mol %.

According to the present invention, component (i) is at least one compound from the group consisting of terephthalic acid (TPA), dimethyl terephthalate (DMT), polyethylene terephthalate
(PET), phthalic anhydride (PA), phthalic acid and isophthalic acid. Preferably, component (i) includes at least one compound from the group consisting of terephthalic acid (TPA), dimethyl terephthalate (DMT), polyethylene terephthalate (PET), phthalic anhydride (PA) and phthalic acid, more preferably consisting of terephthalic acid (TPA), dimethyl terephthalate (DMT) and polyethylene terephthalate (PET). Component (i) more preferably comprises at least one compound from the group consisting of terephthalic acid and dimethyl terephthalate (DMT). Most preferably, component (i) consists of terephthalic acid.

Accordingly, in a further embodiment, the present invention also provides a polyester polyol (P1) obtainable or obtained by esterification of components (i) to (v) as described above, wherein component (i) is selected fro the group consistina of terephthalic acid and dimethyl terephthalate (DMT).

According to the present invention, component (ii) s one or more fatty acids and/or fatty acid derivatives. In one embodiment of the invention, the fatty acid or fatty acid derivative of component (ii) is selected from the group consisting of castor oil, polyhydroxy fatty acids, ricinoleic acid, hydroxyl-modified oils, grape seed oil, black cumin oil, pumpkin kernel oil, borage seed oil, soybean oil, wheat germ oil, rapeseed oil, sunflower seed oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, thistle oil, walnut oil, animal tallow, for example beef dripping, fatty acids, hydroxyl-modified fatty acids and fatty acid esters based on myristoleic acid, palmitoleic acid, oleic acid, vaccenic acid, petroselic acid, gadoleic acid, erucic acid, nervonic acid, linoleic acid, :-linolenic acid, y-linolenic acid, stearidonic acid, arachidonic acid, timnodonic acid, clupanodonic acid and cervonic acid.

In one preferred embodiment of the present invention, the fatty acid or fatty acid derivative (ii) is selected from the group consisting of oleic acid, soya oil, rapeseed oil or tallow, more preferably oleic acid, soya oil, rapeseed oil or beef dripping and most preferably oleic acid.

The admixture of fatty acid or of a fatty acid derivative improves inter alia the blowing agent solubility in the production of polyurethane foams.

Accordingly, in a further embodiment, the present invention also provides a polyester polyol (P1) obtainable or obtained by esterification of components (i) to (v) as described above, wherein component (ii) is selected from the group consisting of oleic acid, soya oil, rapeseed oil and tallow.

According to the present invention, component (iii) comprises one or more aliphatic or cycloaliphatic diols having 2 to 18 carbon atoms or alkoxylates thereof. The aliphatic or cycloaliphatic diol is preferably selected from the group consisting of ethylene glycol, diethylene glycol, propylene glycol, 1,3-propanediol, 1,4-butanediol, 1,5-pentane 1,6-hexanediol, 2-methyl-1,3-propanediol and 3-methyl-1,5-pentanediol and alkoxylates, preferably ethoxylates, of same. The aliphatic diol is more preferably selected from the group consisting of polyethylene glycol (PEG), diethylene glycol (DEG) and monoethylene glycol (MEG), more preferably consisting of diethylene glycol (DEG) and monoethylene glycol (MEG), in particular diethylene glycol (DEG).

Accordingly, in a further embodiment, the present nvention also provides a polyester polyol (P1) obtainable or obtained by esterification of components (i) to (v) as described above, wherein component (iii) is selected from the group consisting of diethylene glycol (DEG) and monoethylene glycol (MEG).

According to the present invention, component (iv) is a polyether polyol prepared by alkoxylating an aromatic starter molecule having a functionality of not less than 2. Examples of these aromatic starter molecules include, for example, aromatic di- and polycarboxylic acids such as terephthalic acid, phthalic acid and isophthalic acid, bisphenol A, aniline and derivatives thereof, any diphenylmethanediamine isomer (MDA), polymeric MDA (pMDA) and any tolylenediamine isomer (TDA). Aromatic carboxylic acids are preferably not used as starter molecules. The starter molecule is more preferably selected from the group consisting of bisphenol A, aniline and derivatives thereof, MDA, pMDA and TDA, more preferably consisting of bisphenol A, MDA, pMDA and TDA, yet more preferably consisting of MDA, pMDA and TDA, yet still more preferably consisting of MDA and TDA, more preferably TDA.

Particular preference is given to using a tolylenediamine (TDA) isomer mixture comprising not less than 50 wt %, preferably not less than 70 wt %, more preferably not less than 80 wt %, yet more preferably not less than 90 wt % and yet still more preferably not less than 95 wt % of isomers having a vicinal position of the two amino groups relative to each other, as starter molecule.

The polyether polyol (iv) having a functionality above 2 and prepared by alkoxylating an aromatic polyol having a functionality of not less than 3 is used with preference.

In general, said polyether polyol (iv) has a functionality of greater than 2. Its functionality is preferably not less than 2.7, more preferably not less than 2.9, yet more preferably not less than 3.5. The functionality is generally not more than 6, preferably not more than 5, more preferably not more than 4.

In a particularly preferred embodiment, said polyether polyol (iv) is obtainable or obtained by alkoxylation with ethylene oxide. It was found that using these compounds leads to riaid polyurethane and/or polyisocyanurate foams having improved fire protection properties.

In one embodiment of the present invention, said polyether polyol (iv) is obtainable by reacting an aromatic polyol having a functionality of greater than 2 with ethylene oxide and/or propylene oxide, preferably with ethylene oxide.

In a particlarly preferred embodiment of the present invention, component (iv) is prepared by anionic polymerization of propylene oxide or ethylene oxide, preferably ethylene oxide, in the presence of alkoxylation catalysts such as alkali metal hydroxides, such as sodium hydroxide or potassium hydroxide (KOH), or alkali metal alkoxides, such as sodium methoxide, sodium ethoxide, potassium ethoxide or potassium isopropoxide, or amine-type alkoxylation catalysts, such as dimethylethanolamine (DMEOA), imidazole and imidazole derivatives and also mixtures thereof, by using at least one aromatic starter molecule. Preferred alkoxylation catalysts here are KOH and amine-type alkoxylation catalysts. Since the use of KOH as alkoxylation catalyst requires the polyether to be first neutralized and the resultant potassium salt to be separated off before the polyether is usable as component (iv) in the esterification, the use of amine-type alkoxylation catalysts is preferable. Preferable amine-type alkoxylation catalysts are selected from the group consisting of dimethylethanolamine (DMEOA), imidazole and imidazole derivatives and also mixtures thereof, more preferably imidazole.

The OH number of polyether polyol (iv), prepared by alkoxylating an aromatic starter molecule having a functionality of not less than 2, is preferably not less than 100, more preferably not less than 200, yet more preferably not less than 300, yet still more preferably not less than 400 and yet still even more preferably not less than 500 mg KOH/g.

The OH number of polyether polyol (iv), prepared by alkoxylating an aromatic starter molecule having a functionality of not less than 2, is further preferably not more than 1800, more preferably not more than 1200, yet more preferably not more than 1000, yet still more preferably not more than 800, yet still even more preferably not more than 700 and most preferably not more than 600 mg KOH/g.

In a particularly preferred embodiment of the invention, polyether polyol (iv) consists of the reaction product of tolylenediamine (TDA) with ethylene oxide, the OH number of said polyether polyol (iv) is in the range from 400 to 800 ma KOH/g, preferably from 500 to 600 mg KOH/g, and imidazole is used as alkoxylation catalyst.

Accordingly, in a further embodiment, the present invention also provides a polyester polyol (P1) obtainable or obtained by esterification of components (i) to (v) as described above wherein component (iv) is obtainable or obtained by ethoxylating an aromatic polyol having a functionality of greater than 2.

Accordingly, in a further embodiment, the present nvention also provides a polyester polyol (P1) obtainable or obtained by esterification of components (i) to (v) as described above wherein component (iv) is obtainable or obtained by ethoxylating a composition consisting of tolylenediamine isomers and comprising not less than 90 wt % of tolylenediamine isomers having a vicinal position for the two amino groups.

According to the present invention, a tri- or polyol other than component (iv) is used as component (v). Said tris or polyol (v), which differs from component (iv), is preferably selected from the group consisting of polyols having a functionality of not less than 3 and/or alkoxylates, preferably ethoxylates, thereof. The use of ethylene oxide leads to rigid foams having improved properties in the event of a fire.

Particularly suitable examples of polyols having a functionality of not less than 3 are glycerol, trimethylolpropane, pentaerythritol, sorbitol, sucrose, polyglycerol and also alkoxylates thereof.

In the present invention, polyol (v) is preferably selected from the group consisting of glycerol, trimethylolpropane, pentaerythritol and also alkoxylates thereof, more preferably glycerol, trimethylolpropane and also alkoxylates thereof, yet more preferably glycerol and also alkoxylates thereof, yet still more preferably glycerol alkoxylates and yet still even more preferably glycerol ethoxylates.

In a particularly preferred embodiment of the present invention, component (v) is prepared by anionic polymerization of propylene oxide or ethylene oxide, preferably ethylene oxide, in the presence of alkoxylation catalysts such as alkali metal hydroxides, such as sodium hydroxide or potassium hydroxide, or alkali metal alkoxides, such as sodium methoxide, sodium ethoxide, potassium ethoxide or potassium isopropoxide, or amine-type alkoxylation catalysts, such as dimethylethanolamine (DMEOA), imidazole and imidazole derivatives and also mixtures thereof, by using at least one starter molecule. Preferred alkoxylation catalysts here are KOH and amine-type alkoxylation catalysts. Since the use of KOH as alkoxylation catalyst requires the polyether to be first neutralized and the resultant potassium salt to be separated off before the polyether is usable as component (v) in the esterification, the use of amine-type alkoxylation catalysts is preferable. Preferable amine-type alkoxylation catalysts are selected from the group consisting of dimethylethanolamine (DMEOA), imidazole and imidazole derivatives and also mixtures thereof, more preferably imidazole.

The OH number of tri- or polyol (v) is preferably in the range from 150 to 1250 mg KOH/g, more preferably from 300 to 950 mg KOH/g, yet more preferably from 500 to 800 mg KOH/g.

Polyether (v) is used with preference for the purposes of the present invention when the average functionality of the aromatic starter molecule used for the preparation of component (iv) is below 3, preferably below 2.8, more preferably below 2.6, yet more preferably below 2.4 and yet still more preferably below 2.2.

Components (iv) and (v) are preferably used in such amounts that, per kg of polyester polyol (P1) obtained according to the present invention, not less than 200 mmol, preferably not less than 400 mmol, more preferably not less than 600 mmol, yet more preferably not less than 800 mmol and yet still more preferably not less than 1000 mmol are used of component (iv) and (v) constituents having an OH functionality of not less than 3.

The present invention preferably utilizes an alkoxylation product of an aromatic polyol having a functionality of not less than 3 as component (iv) and no component (v). The aromatic polyol used for preparing component (iv) is preferably MDA or TDA, preferably TDA.

The number-weighted average functionality of polyester polyol (P1) according to the present invention is preferably not less than 2, more preferably greater than 2, yet more preferably greater than 2.2 and yet still more preferably greater than 2.3, which leads to a higher level of crosslink density for the polyurethane prepared therewith and hence to better mechanical properties on the part of the polyurethane foam.

Polyester polyols (P1) are obtainable by polycondensing components (i) to (v) in the absence of a catalyst or preferably in the presence of an esterification catalyst, advantageously in an atmosphere of inert gas such as nitrogen in the melt at temperatures of 150 to 280° C., preferably 180 to 260° C. optionally under reduced pressure to the desired acid number, which is advantageously less than 10 and preferably less than 2. In one preferred embodiment, the esterification mixture is polycondensed at the abovementioned temperatures to an acid number of 80 to 20, preferably 40 to 20, under atmospheric pressure and subsequently under a pressure of less than 500 mbar, preferably 40 to 400 mbar. Useful esterification catalysts include, for example, iron, cadmium, cobalt, lead, zinc, antimony, magnesium, titanium and tin catalysts in the form of metals, metal oxides or metal salts. However, the polycondensation reaction may also be carried out in a liquid phase in the presence of diluent and/or entrainer materials, for example benzene, toluene, xylene or chlorobenzene, to remove the water of condensation by azeotropic distillation.

The molar ratio in which the organic polycarboxylic acids and/or polycarboxylic acid derivatives and polyhydric alcohols are polycondensed to prepare polyester polyols (P1) is advantageously in the range from 1:1 to 2.2, preferably in the range from 1:1.05 to 2.1 and more preferably in the range from 1:1.1 to 2.0.

The number average molecular weight of polyester polyols (P1) according to the present invention is generally in the range from 300 glrnol to 3000 g/mol, preferably from 400 g/mol to 1000 g/mol and more preferably from 450 g/mol to 800 g/mol.

Accordingly, in a further embodiment, the present invention also provides a polyester polyol (P1) obtainable or obtained by esterification of components (i) to (v) as described above wherein said polyester polyol (P1) has a number average molecular weight in the range from 450 g/mol to 800 g/mol.

The polyester polyols (P1) of the present invention are very useful in the production of polyurethanes and/or polyisocyanurates, in particular rigid polyurethane or polyisocyanurate foams. The preparation of polyurethanes is in principle known from the prior art. It typically involves the reaction between an isocyanate component and a polyol component in the presence of catalysts and blowing agents.

The use in the polyol component of polyester polyol (P1) according to the present invention leads to polyurethane or polyisocyanurate foams of advantageous fire behavior. The process for producing rigid polyurethane foams in the manner of the present invention utilizes conventional reaction components in addition to the above-described polyester polyols (P1) of the present invention.

In a further aspect, the present invention also provides a process for producing rigid polyurethane foams or riaid polyisocyanurate foams which comprises the reaction of
A) a component (A) comprising at least one compound selected from the group consisting of organic diisocyanates, modified oraanic diisocyanates, organic polyisocyanates and modified organic polyisocyanates, with
B) a polyol component (PK) comprising
  (b1.1) at least one polyester polyol (P1) as described above,
  (b2) at least one flame retardant,
  (b3) at least one blowing agent,
  (b4) at least one catalyst.

According to the present invention, said polyol component (PK) comprises at least one polyester polyol (P1) and may comprise further isocyanate-reactive compounds, in particular further polyester polyols or polyether polyols.

Accordingly, in a further embodiment, the present invention also provides a process for producing rigid polyurethane or polyisocyanurate foams as described above wherein said polyol component (PK) comprises one or more of the following compounds:
  (b1.2) at least one polyester polyol (P2) other than said polyester polyol (P1),
  (b1.3) at least one compound selected from the group consisting of polyetherols (P3), compounds having two or more isocyanate-reactive groups, chain-extending agents and crosslinking agents,
  (b5) further auxiliaries and/or admixture agents.

According to the present invention, component (A) comprises at least one compound selected from the group consisting of organic diisocyanates, modified organic diisocyanates, organic polyisocyanates and modified organic polyisocyanates.

A polyisocyanate within the purview of the present invention is any organic compound comprising more than two reactive isocyanate groups per molecule; i.e., the functionality is greater than 2. A diisocyanate within the purview of the present invention is any organic compound comprising two reactive isocyanate groups per molecule, i.e., the functionality is 2.

The organic or modified organic di- or polyisocyanates of component (A) include the aliphatic, cycloaliphatic and araliphatic isocyanates known per se and preferably the aromatic polyfunctional isocyanates. Polyfunctional isocyanates of this type are known per se or obtainable by methods known per se. Polyfunctional isocyanates are particularly also usable as mixtures, so component (A) will in this case comprise various polyfunctional isocyanates. Polyfunctional isocyanates suitable for use in component (A) have two (diisocyanates) or more than two (polyisocyanates) isocyanate groups per molecule.

Specifically the following are suitable in particular: alkylene diisocyanates having 4 to 12 carbon atoms in the alkylene moiety, such as 1,12-dodecane diioscyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanates and also any desired mixtures of these isomers, 1-isocyanato-3,3,5-trimethyl-5-isocyanatomethylcyclohexane (IPDI), 2,4- and 2,6-hexahydrotolylene diisocyanates and also the corresponding isomeric mixtures, 4,4'-, 2,2'- and 2,4'-dicyclohexylmethane diisocyanates and also the corresponding isomeric mixtures, and preferably aromatic polyisocyanates, such as 2,4- and 2,6-tolylene diisocyanates and the corresponding isomeric mixtures, 4,4'-, 2,4'- and 2,2'-diphenylmethane diisocyanates and the corresponding isomeric mixtures, mixtures of 4,4'- and 2,2'-diphenylmethane diisocyanates, polyphenylpolymethylene polyisocyanates, mixtures of 4,4'-, 2,4'- and 2,2'-diphenylmethane diisocyanates and polyphenylpolymethylene polyisocyanates (crude MDI) and mixtures of crude MDI and tolylene diisocyanates.

Of particular suitability are 2,2'-, 2,4'- and/or 4,4'-diphenylmethane diisocyanate (MDI), 1,5-naphthylene diisocyanate (NDI), 2,4- and/or 2,6-tolylene diisocyanate (TDI), 3,3'-dimethyl-biphenyl diisocyanate, 1,2-diphenylethane diisocyanate and/or p-phenylene diisocyanate (PPDI), tri-, tetra-, penta-, hexa-, hepta- and/or octamethylene diisocyanate, 2-methylpenta-methylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethyl-cyclohexane (isophorone diisocyanate, IPDI), 1,4- and/or 1,3-bis(isocyanatomethyl)cyclohexane (HXDI) 1,4-cyclohexane diisocyanate, 1-methyl-2,4- and/or 2,6-cyclohexane diisocyanate and 4,4'-, 2,4'- and/or 2,2'-dicyclohexylmethane diisocyanate.

Use is frequently also made of modified polyisocyanates, i.e., products obtained by chemical reaction of organic polyisocyanates and having two or more reactive isocyanate groups per molecule. Polyisocyanates comprising ester, urea, biuret, allophanate, carbodiimide, isocyanurate, uretdione, carbamate and/or urethane groups may be mentioned in particular.

Particularly preferred for use as polyisocyanates within the purview of the present nvention are:
a) polyfunctional isocyanates based on tolylene diisocyanate (TDI), in particular 2,4-TDI or 2,6-TDI or mixtures of 2,4- and 2,6-TDI;
b) polyfunctional isocyanates based on diphenylmethane diisocyanate (MDI), in particular 2,2'-MDI or 2,4'-MDI or 4,4'-MDI or oligomeric MDI, which is also known as polyphenylpolymethylene isocyanate, or mixtures of two or three aforementioned diphenylmethane diisocyanates, or crude MDI, which is generated in the production of MDI, or mixtures of at least one oligomer of MDI and at least one of the aforementioned low molecular weight MDI derivatives;
c) mixtures of at least one aromatic isocyanate as per embodiment a) and at least one aromatic isocyanate as per embodiment b).

Polymeric diphenylmethane diisocyanate is very particularly preferred for use as polyisocyanate within the purview of the present invention. Polymeric diphenylmethane diisocyanate (hereinafter referred to as polymeric MDI) comprises a mixture of binuclear MDI and oligomeric condensation products and thus derivatives of diphenylmethane diisocyanate (MDI). Polyisocyanates may preferably also be constructed from mixtures of monomeric aromatic diisocyanates and polymeric MDI. Polymeric MDI, in addition to binuclear MDI, comprises one or more polynuclear condensation products of MDI having a functionality of more than 2, in particular 3 or 4 or 5. Polymeric MDI is known and is frequently also referred to as polyphenylpolymethylene isocyanate or else as oligomeric MDI. Polymeric MDI is typically constructed from a mixture of MDI-based isocyanates having differing functionality. Polymeric MDI is typically used in admixture with monomeric MDI.

The (average) functionality of a polyisocyanate comprising polymeric MDI may vary in the range from about 2.2 to about 5, in particular from 2.3 to 4, in particular from 2.4 to 3.5. It is particularly the crude MDI obtained as an intermediate in the production of MDI which is such a mixture of MDI-based polyiunctional isocyanates having different functionalities.

Polyfunctionai isocyanates or mixtures of two or more polyfunctional isocyanates based on MDI are known and available, for example from BASF Polyurethanes GmbH under the name of Lupranat®.

The functionality of component (A) is preferably not less than 2, in particular not less than 2.2 and more preferably not less than 2.4. The functionality of component (A) is preferably from 2.2 to 4 and more preferably from 2.4 to 3.

The isocyanate group content of component (A) is preferably from 5 to 10 mmol/g, in particular from 6 to 9 mmol/g, more preferably from 7 to 8.5 mmol/g. A person skilled in the art is aware of a reciprocal relationship between the isocyanate group content in mmol/g and the so-called equivalence weight in g/equivalent. The isocyanate group content in mmol/g is derived from the content in wt % as described in ASTM D-5155-96 A.

In one particularly preferred embodiment, component (A) consists of at least one polyfunctional isocyanate selected from diphenylmethane 4,4'-diisocyanate, diphenylmethane 2,4'-diisocyanate, diphenylmethane 2,2'-diisocyanate and oligomeric diphenylmethane diisocyanate. In this preferred embodiment, component (A) more preferably comprises oligomeric diphenylmethane diisocyanate and has a functionality of not less than 2.4.

The viscosity of component (A) used may vary between wide limits. The viscosity of component (A) is preferably from 100 to 3000 mPa*s, more preferably from 200 to 2500 mPa·s.

In addition to polyesterol (P1) of the present invention, the polyol component (PK) may include further compounds having isocyanate-reactive groups, for example OH-functional compounds such as polyesterols or polyetherols. Preferably, said polyol component comprises as a component (b1.2) at least one polyester polyol (P2) other than polyester polyol (P1), and/or as a component (b1.3) at least one compound selected from the group consisting of polyetherols (P3), compounds having two or more isocyanate-reactive groups, chain-extending agents and crosslinking agents.

Polyol component (PK) may further comprise as a component (b5) further auxiliaries and/or admixture agents.

Suitable polyester polyols (P2) differ from polyester polyols (P1) and are obtainable, for example, from organic dicarboxylic acids having 2 to 12 carbon atoms, preferably aromatic ones, or mixtures of aromatic and aliphatic dicarboxylic acids and polyhydric alcohols, preferably diols, having 2 to 12 carbon atoms, preferably 2 to 6 carbon atoms.

Useful dicarboxylic acids include in particular succinic acid, glutaric acid, adipic acid, suberic acid, azelaic acid, sebacic acid, decanedicarboxylic acid, maleic acid, fumaric acid, phthalic acid, isophthalic acid and terephthalic acid. It is similarly possible to use derivatives of these dicarboxylic acids, for example dimethyl terephthalate. The dicarboxylic acids may be used not only singly but also in admixture. Instead of the free dicarboxylic acids, it is also possible to use the corresponding dicarboxylic acid derivatives, for example dicarboxylic esters of alcohols having 1 to 4 carbon atoms or dicarboxylic anhydrides. Aromatic dicarboxylic acids used are preferably phthalic acid, phthalic anhydride, terephthalic acid and/or isophthalic acid in admixture or alone. The aliphatic dicarboxylic acids used are preferably dicarboxylic acid mixtures of succinic, glutaric and adipic acids in ratios of for example 20 to 35:35 to 50:20 to 32 parts by weight, and particularly adipic acid. Examples of di- and polyhydric alcohols, in particular diols, are ethanediol, diethylene glycol, 1,2-propanediol, 1,3-propanediol, dipropylene glycol, 1,4-butanediol, 1,5-pentanediol, 1,6-hexanediol, 1,10-decanediol, glycerol, trimethylolpropane and pentaerythritol. Preference is given to using ethanediol, diethylene glycol, 1,4-butanediol, 1,5-pentanediol, 1,6-hexanediol or mixtures of two or more thereof, in particular mixtures of 1,4-butanediol, 1,5-pentanediol and 1,6-hexanediol. It is further possible to use polyester polyols formed from lactones, e.g. ε-caprolactone or hydroxy carboxylic acids, e.g., ω-hydroxycaproic acid.

Biobased starting materials and/or derivatives thereof also come into consideration for preparing the further polyester polyols (P2), examples being castor oil, polyhydroxy fatty acids, ricinoleic acid, hydroxyl-modified oils, grape seed oil, black cumin oil, pumpkin kernel oil, borage seed oil, soybean oil, wheat germ oil, rapeseed oil, sunflower seed oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, thistle oil, walnut oil, fatty acids, hydroxyl-modified fatty acids and fatty acid esters based on myristoleic acid, paimitoleic acid, oleic acid, vaccenic acid, petroselic acid, gadoleic acid, erucic acid, nervonic acid, linoleic acid, α-linolenic acid, γ-linolenic acid, stearidonic acid, arachidonic acid, timnodonic acid, clupanodonic acid and cervonic acid.

The mass ratio of polyester polyols (P1) to polyester polyols (P2) is generally not less than 0.1, preferably not less than 0.5, more preferably not less than 1 and yet more preferably not less than 2.

One particularly preferred embodiment does not utilize any further polyester polyols (P2).

Accordingly, in a further embodiment, the present invention also provides a process for producing rigid polyurethane or polyisocyanurate foams as described above wherein said polyol component (PK) comprises no further polyester polypi (P2) in addition to said polyester polyol (P1).

Polyol component (PK) may further comprise, as a component (b1.3), at least one compound selected from the group consisting of polyetherols (P3), compounds having two or more isocyanate-reactive groups, chain-extending agents and crosslinking agents.

Polyetherols, other compounds having two or more isocyanate-reactive groups, chain-extending agents and crosslinking agents useful in the production of rigid polyurethane or polyisocyanurate foams are known per se to a person skilled in the art.

It is preferred to use at least one polyether polyol (P3) as component (b1.3). Polyetherols (P3) are obtainable by known methods, for example by anionic polymerization of one or more alkylene oxides having 2 to 4 carbon atoms with alkali metal hydroxides, such as sodium hydroxide or potassium hydroxide, alkali metal alkoxides, such as sodium methoxide, sodium ethoxide, potassium ethoxide or potassium isopropoxide, or amine-type alkoxylation catalysts, such as dimethylethanolamine (DMEOA), imidazole and/or imidazole derivatives, by using at least one starter molecular comprising 2 to 8. preferably 2 to 6 reactive hydrogen atoms in attached form, or by cationic polymerization with Lewis acids, such as antimony pentachloride, boron fluoride etherate or fuller's earth.

Suitable alkylene oxides include, for example, tetrahydrofuran, 1,3-propylene oxide, 1,2-butylene oxide, 2,3-butylene oxide, styrene oxide and preferably ethylene oxide and 1,2-propylene oxide. Alkylene oxides are usable singly, alternatingly in succession or as mixtures. Preferred alkylene oxides are propylene oxide and ethylene oxide, and ethylene oxide is particularly preferable.

Useful starter molecules include, for example, water, organic dicarboxylic acids, such as succinic acid, adipic acid, phthalic acid and terephthalic acid, aliphatic and aromatic, optionally N-mono-. N,N- and N,N'-dialkyl-substituted diamines having 1 to 4 carbon atoms in the alkyl moiety, such as optionally mono- and dialkyl-substituted ethylenediamine, diethylenetriamine, triethylenetetramine, 1,3-propylenediamine, 1,3-butylenediamine, 1,4-butylenediamine, 1,2-, 1,3-, 1,4-, 1,5- and 1,6-hexamethylenediamines, phenylenediamines, 2,3-, 2,4- 2,6-tolylenediamines and 4,4'-, 2,4'- and 2,2'-diaminodiphenylmethanes. The diprimary amines mentioned are particularly preferable, ethylenediamine is an example.

Useful starter molecules further include aikanolamines, e.g., ethanolamine, N-methylethanol-amine, N-ethylethanolamine, dialkanolamines, e.g., diethanolamine. N-methyldiethanolamine and N-ethyldiethanolamine, and trialkanolamines, e.g., triethanolamine, and ammonia.

Preference is given to using di- or polyhydric alcohols, such as ethanediol, 1,2-propanediol, 1,3-propanediol, diethylene glycol (DEG), dipropylene glycol, 1,4-butanediol, 1-6-hexanediol, glycerol, trimethylolpropane, pentaerythritol, sorbitol and sucrose.

The polyether polyols (P3) are preferably polyoxypropylene polyols and polyoxyethylene polyols, more preferably polyoxyethyiene polyols, and have a functionality of preferably 2 to 6, more preferably 2 to 4, yet more preferably 2 to 3 and specifically 2 and number average molecular weights of 150 g/mol to 3000 g/mol, preferably 200 g/mol to 2000 g/mol and more preferably 250 g/mol to 1000 g/mol.

Two more more polyether polyols (P3) are also usable for the purposes of the present invention.

One preferred embodiment of the invention uses an alkoxylated diol, preferably an ethoxylated diol, for example ethoxylated ethylene glycol, as polyether polyol (P3) which more preferably comprises polyethylene glycol.

In one specific embodiment of the invention, component (b1.3) consists exclusively of a polyether polyol (P3), preferably exclusively of polyethylene glycol, preferably having a number-average molecular weight of 250 g/mol to 1000 g/mol.

Accordingly, in a further embodiment, the present invention also provides a process for producing rigid polyurethane or polyisocyanurate foams as described above wherein the polyether polyol component of (b1.3) comprises polyethylene glycol only and no further polyether polyols are used.

The proportion of polyether polyols (P3) is generally in the range from 0 to 11 wt %, preferably from 2 to 9 wt %, more preferably from 4 to 8 wt %, based on the sum total of polyol component (PK).

The mass ratio of the sum total of poiyesterols (P1) and (P2) to the sum total used of polyetherols (P3) is generally not less than 0.1, for example greater than 1, preferably greater than 2, more preferably greater than 5, yet more preferably greater than 10 and yet still more preferably greater than 12.

Accordingly, in a further embodiment, the present invention also provides a process for producing rigid polyurethane or polyisocyanurate foams as described above wherein the mass ratio of total polyesterols (P1) and (P2) to the total used of polyetherols (P3) is not less than 0.1.

The mass ratio of total polyesterols (P1) and (P2) to the total used of polyetherols (P3) is further generally less than 80, preferably less than 40, more preferably less than 30, yet more preferably less than 20, yet still more preferably less than 16 and yet still even more preferably less than 13.

According to the presen invention, the polyol component (PK) comprises at least one flame retardant (b2). The prior art flame retardants are generally usable as flame retardants (b2). Suitable flame retardants include, for example, brominated esters, brominated ethers (lxol) or brominated alcohols such as dibromoneopentyl alcohol, tribromoneopentyl alcohol and PHT-4-diol, and also chlorinated phosphates such as tris(2-chloroethyl) phosphate, tris(2-chloropropyl) phosphate (TCPP), tris(1,3-dichloropropyl) phosphate, tricresyl phosphate, tris(2,3-dibromopropyl) phosphate, tetrakis(2-chloroethyl) ethylenediphosphate, dimethyl methanephosphonate, diethyl diethanolaminomethylphosphonate and also commercially available halogenated flame retardant polyols. By way of further phosphates or phosphonates there may be used diethyl ethanephosphonate (DEEP), triethyl phosphate (TEP), dimethyl propylphosphonate (DMPP) or diphenyl cresyl phosphate (DPK) as liquid flame retardants.

In addition to the abovementioned flame retardants, the present invention also provides for organic or inorganic flame retardants, such as red phosphorus, preparations comprising red phosphorus, aluminum oxide hydrate, antimony trioxide, arsenic oxide, ammonium polyphosphate and calcium sulfate, expandable araphite or cyanuric acid derivatives, e.g., melamine, or mixtures of two or more flame retardants, e.g., ammonium polyphosphates and melamine and optionally also maize starch or ammonium polyphosphate, melamine, expandable graphite and optionally aromatic polyesters to be used to confer flame resistance on rigid polyurethane foams.

Preferred flame retardants have no isocyanate-reactive groups. The flame retardants are preferably liquid at room temperature, TCPP, DEEP, TEP, DMPP and DPK are particularly preferable.

The proportion of flame retardant (b2) is generally in the range from 2 to 50 wt %, preferably from 5 to 30 wt % and more preferably from 8 to 25 wt %, based on the polyol component (PK). Accordingly, in a further embodiment, the present invention also provides a process for producing rigid polyurethane or polyisocyanurate foams as described above wherein flame retardant component (b2) comprises tris(2-chloropropyl) phosphate (TCPP) only and no further flame retardants are used.

According to the present invention, the polypi component (PK) comprises at least one blowing agent (b3). Blowing agents (b3) which are used for producing the rigid polyurethane foams include preferably water, formic acid and mixtures thereof. These react with isocyanate groups to form carbon dioxide and in the case of formic acid carbon dioxide and carbon monoxide. Since these blowing agents release the gas through a chemical reaction with the isocyanate groups, they are termed chemical blowing agents. In addition, physical blowing agents such as low-boiling hydrocarbons can be used. Suitable in particular are liquids which are inert towards the isocyanates used and have boiling points below 100° C., preferably below 50° C., at atmospheric pressure, so that they vaporize under the influence of the exothermic polyaddition reaction. Examples of such liquids which can preferably be used are alkanes such as heptane, hexane, n-pentane and isopentane, preferably industrial mixtures of n-pentane and isopentane, n-butane and isobutane and propane, cycloalkanes such as cyclopentane and/or cyclohexane, ethers such as furan, dimethyl ether and diethyl ether, ketones such as acetone and methyl ethyl ketone, alkyl carboxylates such as methyl formate, dimethyl oxalate and ethyl acetate and halogenated hydrocarbons such as methylene chloride, dichloromonofluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane and heptafluoropropane. Mixtures of these low-boiling liquids with one another and/or ith other substituted or unsubstituted hydrocarbons can also be used. Organic carboxylic acids such as formic acid, acetic acid, oxalic acid, ricino eic acid and carboxyl-containing compounds are also suitable.

It is preferable not to use any halogenated hydrocarbons as blowing agents. It is preferable to use water, formic acid-water mixtures or formic acid as chemical blowing agents and formic acid-water mixtures or formic acid are particularly preferred chemical blowing agents. Pentane isomers or mixtures of pentane isomers are preferably used as physical blowing agents.

The chemical blowing agents can be used alone, i.e., without addition of physical blowing agents, or together with physical blowing agents. Preferably, the chemical blowing agents are used together with physical blowing agents, in which case the use of formic acid-water mixtures or pure formic acid together with pentane isomers or mixtures of pentane isomers is preferred.

The blowing agents are either wholly or partly dissolved in the polyol component (PK) or are introduced via a static mixer immediately before foaming of the polyol component. It is usual for water, formic acid-water mixtures or formic acid to be fully or partially dissolved in the polyol component and the physical blowing agent (for example pentane) and any remainder of the chemical blowing agent to be introduced "on-line".

The polyol component is admixed in situ with pentane, possibly some of the chemical blowing agent and also with all or some of the catalyst. Auxiliary and admixture agents as well as flame retardants are usually already comprised in the polyol blend.

The amount used of blowing agent or blowing agent mixture is generally in the range from 1 to 45 wt %, preferably from 1 to 30 wt %, more preferably from 1.5 to 20 wt %, all based on total polyol component (PK).

When water, formic acid oraformioaoiU-mxsterrnixturo is used as blowing agent, the amount thereof admixed to the polyol component (PK) is preferably from 0.2 to 20 wt %, based on component (b1.1). The admixture of water, of formic acid or of formic acid-water mixture may be combined with the use of other blowing agents described. Preference is given to using formic acid or a formic acid-water mixture in combination with pentane.

Accordingly, in a further embodiment, the present invention also provides a process for producing rigid polyurethane or polyisocyanurate foams as described above wherein blowing agent component (b5) comprises chemical and physical blowing agents, wherein the chemical blowing agent is selected from the group consisting of water, formic acid-water mixtures and formic acid, and the physical blowing agent consists of one or more pentane isomers.

According to the present invention, the polyol component (PK) comprises at least one catalyst (b4). According to the present invention, rigid polyurethane foams or rigid polyisocyanurate foams are obtainable. Suitable catalysts for producing the respective foams are in principle known from the prior art.

Catalysts (b4) used for producing rigid polyurethane foams are particularly compounds that ensure substantial hastening of the reaction of the polyol component (PK) compounds comprising reactive hydrogen atoms, in particular hydroxyl groups, with component (A).

It is advantageous to use basic polyurethane catalysts, for example tertiary amines such as triethylamine, tributylamine, dimethylbenzylamine, dicyclohexylmethylamine, dimethylcyclo-hexylamine, N,N,N',N'-tetramethyldiaminodiethyl ether, bis(dimethylaminopropl)urea, N-methylmorpholine or N-ethylmorpholine, N-cyclohexylmorpholine, N,N,N',N'-tetra-methylethylenediamine, N,N,N,N-tetramethylbutanediamine, N,N,N,N-tetramethylhexane-1,6-diamine, pentamethyldiethylenetriamine, bis(2-dimethylaminoethyl) ether, dimethylpiperazine, N-dimethylaminoethylpiperidine, 1,2-dimethylimidazole, 1-azabicyclo[2.2.0]octane, 1,4-diaza-bicyclo[2.2.2]octane (Dabco) and alkanolamine compounds, such as triethanolamine, triisopropanolamine, N-methyldiethanolamine and N-ethyldiethanolamine, dimethylamino-ethanol, 2-(N, N-dimethylaminoethoxy)ethanol, N,N',N"-tris(dialkylaminoalkyl)hexahydrotriazines, e.g. N,N',N"-tris(dimethylaminopropyl)-s-hexahydrotriazine, and triethylenediamine. However, metal salts such as iron(II) chloride, zinc chloride, lead octoate and preferably tin salts such as tin dioctoate, tin diethylhexoate and dibutyltin dilaurate and also, in particular, mixtures of tertiary amines and organic tin salts are also suitable.

Further possible catalysts are: amidines such as 2,3-dimethyl-3,4,5,6-tetrahydropyrimidine, tetraalkylammonium hydroxides such as tetramethylammonium hydroxide, alkali metal hydroxides such as sodium hydroxide and alkali metal alkoxides such as sodium methoxide and potassium isopropoxide, alkali metal carboxylates and also alkali metal salts of long-chain fatty acids having from 10 to 20 carbon atoms and optionally lateral OH groups. Preference is given to using from 0.001 to 10 parts by weight of catalyst or catalyst combination, based (i.e., reckoned) on 100 parts by weight of component B). It is also possible to allow the reactions to proceed without catalysis. In this case, the catalytic activity of amine-started polyols is exploited.

When, during foaming, a relatively large polyisocyanate excess is used, further suitable catalysts for the trimerization reaction of the excess NCO groups with one another are: catalysts which form isocyanurate groups, for example ammonium ion salts or alkali metal salts, specifically ammonium or alkali metal carboxylates, either alone or in combination with tertiary amines. lsocyanurate formation leads to flame-resistant PIR foams which are preferably used in industrial rigid foam, for example in building and construction as insulation boards or sandwich elements.

Further information regarding the abovementioned and further starting materials may be found in the technical literature, for example Kunststoffhandbuch, Volume VII, Polyurethane. Carl Hanser Verlag Munich. Vienna, 1st, 2nd and 3rd Editions 1966, 1983 and 1993.

The reaction mixture for producing rigid polyurethane foams may optionally be admixed with still further auxiliaries and/or admixture agents as component (b5). Examples include surface-active substances, foam stabilizers, cell regulators, fillers, dyes, pigments, hydrolysis control agents, fungistatic and bacteriostatic substances.

Possible surface-active substances are, for example, compounds which serve to aid homogenization of the starting materials and may also be suitable for regulating the cell structure of the polymers. Mention may be made of, for example, emulsifiers such as the sodium salts of castor oil sulfates or of fatty acids and also salts of fatty acids with amines, e.g. diethylamine oleate, diethanolamine stearate, diethanolamine ricinoleate, salts of sulfonic acids, e.g. alkali metal or ammonium salts of dodecylbenzenedisulfonic or dinaphthylmethane-disulfonic acid and ricinoleic acid; foam stabilizers such as siloxone-oxyalkylene copolymers and other organopolysiloxanes, ethoxylated alkylphenols, ethoxylated fatty alcohols, paraffin oils, castor oil esters or ricinoleic esters, Turkey red oil and peanut oil, and cell regulators such as paraffins, fatty alcohols and dimethylpolysiloxanes. The above-described oligomeric acrylates having polyoxyalkylene and fluoroalkane radicals as side groups are also suitable for improving the emulsifying action, the cell structure and/or for stabilizing the foam. The surface-active substances are usually employed in amounts of from 0.01 to 10 parts by weight, based (i.e., reckoned) on 100 parts by weight of polyol component (PK).

For the purposes of the present invention, fillers, in particular reinforcing fillers, are the customary organic and inorganic fillers, reinforcing materials, weighting agents, agents for improving the abrasion behavior in paints, coating compositions, etc., which are known per se. Specific examples are: inorganic fillers such as siliceous minerals, for example sheet silicates such as antigorite, serpentine, hornblendes, amphiboles, chrisotile and talc, metal oxides such as kaolin, aluminum oxides, titanium oxides and iron oxides, metal salts, such as chalk, barite and inorganic pigments such as cadmium sulfide and zinc sulfide and also glass, etc. Preference is given to using kaolin (china clay), aluminum silicate and coprecipitates of barium sulfate and aluminum silicate and also natural and synthetic fibrous minerals such as wollastonite, metal fibers and in particular glass fibers of various length, which may optionally be coated with a size. Possible organic fillers are, for example: carbon, melamine, rosin, cyclopentadienyl resins and graft polymers and also cellulose fibers, polyamide, polyacrylonitrile, polyurethane, polyester fibers based on aromatic and/or aliphatic dicarboxylic esters and in particular carbon fibers.

The inorganic and organic fillers can be used individually or as mixtures and are advantageously added to the reaction mixture in amounts of from 0.5 to 50 wt %, preferably from 1 to 40 wt %, based on the total weight of components (A) and (PK), although the content of mats, nonwovens and woven fabrics of natural and synthetic fibers can reach values of up to 80 wt %, based on the total weight of components (A) and (PK).

Further information regarding the abovementioned other customary auxiliary and admixture agents may be found in the technical literature, for example the monograph by J. H. Saunders and K. C. Frisch "High Polymers" Volume XVI, Polyurethanes, Parts 1 and 2, Interscience Publishers 1962 and 1964, or Kunststoff-Handbuch, Polyurethane, Volume VII, Hanser-Veriag, Munich, Vienna, 1st and 2nd Editions, 1966 and 1983.

The present invention also provides a polyol component (PK) comprisind the aforementioned components, wherein the mass ratio of the sum total of polyesterols (P1) and optionally (P2) to the polyetherols (P3) used is not less than 0.1, preferably not less than 0.5, more preferably not less than 1, yet more preferably not less than 2 and yet still more preferably not less than 5.

In a further aspect, the present invention also provides a polyol component (PK) comprising
- (b1.1) 50 to 90 wt % of polyester polyol (P1) according to any of embodiments 1 to 8,
- (b1.2) 0 to 20 wt % of at least one polyester polyol (P2),
- (b1.3) 2 to 9 wt % of at least one polyether polyol (P3),
- (b2) 5 to 30 wt % of at least one flame retardant,
- (b3) 1 to 30 wt % of at least one blowing agent,
- (b4) 0.5 to 10 wt % of at least one catalyst, and
- (b5) 0.5 to 20 wt % of further auxiliary and admixture agents, all based on the total weight of polyol component (PK), wherein the weight percentages add up to 100 wt %, and wherein the mass ratio of the sum total of polyesterols (P1) and (P2) to the sum total used of polyetherols (P3) is not less than 2.

In an alternative aspect, the present invention also provides a polyol component (PK*) comprising
- (b1.1) 10 to 90 wt % of polyester polyol (P1) according to any of embodiments 1 to 8,
- (b1.2) 0 to 60 wt % of at least one polyester polyol (P2),
- (b1.3) 0.1 to 11 wt % of at least one polyether polyol (P3),
- (b2) 2 to 50 wt % of at least one flame retardant,
- (b3) 1 to 45 wt % of at least one blowing agent,
- (b4) 0.5 to 10 wt % of at least one catalyst, and
- (b5) 0.5 to 20 wt % of further auxiliary and admixture agents, all as defined above and all based on the total weight of polyol component (PK*), wherein the weight percentages add up to 100 wt %, and wherein the mass ratio of the sum total of polyesterols (P1) and (P2) to the sum total used of polyetherols (P3) is not less than 1.

In a further aspect, the present invention also provides a polyol component (PK**) consisting of
- (b1.1) 50 to 90 wt % of polyester polyol (P1) according to any of embodiments 1 to 8,
- (b1.2) 0 to 20 wt % of at least one polyester polyol (P2),
- (b1.3) 2 to 9 wt % of at least one polyether polyol (P3),
- (b2) 5 to 30 wt % of at least one flame retardant,
- (b3) 1 to 30 wt % of at least one blowing agent,
- (b4) 0.5 to 10 wt % of at least one catalyst, and
- (b5) 0.5 to 20 wt % of further auxiliary and admixture agents, all based on the total weight of polyol component (PK**), wherein the weight percentages add up to 100 wt %, and wherein the mass ratio of the sum total of polyesterols (P1) and (P2) to the sum total used of polyetherols (P3) is not less than 2.

The present invention further also provides a polyol component (PK***) consisting of
- (b1.1) 10 to 90 wt % of polyester polyol (P1) according to any of embodiments 1 to 8,
- (b1.2) 0 to 60 wt % of at least one polyester polyol (P2),
- (b1.3) 0.1 to 11 wt % of at least one polyether polyol (P3),
- (b2) 2 to 50 wt % of at least one flame retardant, (b3) 1 to 45 wt % of at least one blowing agent, (b4) 0.5 to 10 wt % of at least one catalyst, and (b5) 0.5 to 20 wt % of further auxiliary and admixture agents, all as defined above and all based on the total weight of polyol component (PK***), wherein the weight percentages add up to 100 wt %, and wherein the mass ratio of the sum total of polyesterols (P1) and (P2) to the sum total used of polyetherols (P3) is not less than 1.

The present invention further provides that the mass ratio of the sum total of total polyesterols (P1) and (P2) to the sum total used of polyetherols (P3) in the polyol components of the present invention is preferably less than 80, more preferably less than 40, yet more preferably less than 30, yet still more preferably less than 20, yet still even more preferably less than 16 and most preferably less than 13.

To produce rigid polyurethane foams of the present invention, component (A) and polyol component (PK) are mixed in such amounts that the equivalence ratio of the di- or polyisocyanate NCO groups to the sum total of reactive hydrogen atoms in component (PK) is greater than 1, preferably greater than 1.2, more preferably greater than 1.5, yet more preferably greater than 1.8, yet still more preferably greater than 2, yet still even more preferably greater than 2.2, yet still even further more preferably greater than 2.5 and most preferably greater than 3. It is further preferable for the equivalence ratio of NCO groups to the sum total of reactive hydrogen atoms to be less than 10, preferably less than 8, more preferably less than 7, yet more preferably less than 6, yet still more preferably less than 5, yet still even more preferably less than 4.5, yet still even further more preferably less than 4 and most preferably less than 3.5.

The present invention further provides rigid polyurethane foams and rigid polyisocyanurate foams obtainable or obtained by the process of the present invention and also their use in the manufacture of sandwich elements having rigid or flexible outer layers.

The present invention in a further aspect provides rigid polyurethane foams or rigid polyisocyanurate foams obtainable or obtained by a process as described above. Accordingly, the present invention provides rigid polyurethane or polyisocyanurate foams obtainable or obtained by a process for producing rigid polyurethane or polyisocyanurate foams which comprises the reaction of A) a component (A) comprising at least one compound selected from the group consisting of organic diisocyanates, modified organic diisocyanates, organic polyisocyanates and modified organic polyisocyanates, with B) a polyol component (PK) comprising
  (b1.1) at least one polyester polyol (P1) as described above,
  (b2) at least one flame retardant,
  (b3) at least one blowing agent,
  (b4) at least one catalyst.

More particularly, the present invention provides rigid polyurethane or polyisocyanurate foams obtainable or obtained by a process for producing rigid polyurethane or polyisocyanurate foams which comprises the reaction of A) a component (A) comprising at least one compound selected from the group consisting of organic diisocyanates, modified organic diisocyanates, organic polyisocyanates and modified organic polyisocyanates, with B) a polyol component (PK) comprising
  (b1.1) at least one polyester polyol (P1) as described above,
  (b2) at least one flame retardant,
  (b3) at least one blowing agent,
  (b4) at least one catalyst, wherein said polyol component (PK) comprises one or more of the following compounds:
  (b1.2) at least one polyester polyol (P2) other than said polyester polyol (P1),
  (b1.3) at least one compound selected from the group consisting of polyetherols (P3), compounds having two or more isocyanate-reactive groups, chain-extending agents and crosslinking agents,
  (b5) further auxiliaries and/or admixture agents.

The present invention further also provides th ethod of using a polyester polyol (P1) as described above or a polyol component (PK) as described above in the manufacture of rigid polyurethane foams or rigid polyisocyanurate foams.

Further embodiments of the present invention are derivable from the claims and the examples. It will be understood that the aforementioned and hereinbelow elucidated features of the article/process/usages according to the present invention are usable not just in the particular combination recited, but also in other combinations, without leaving the realm of the invention. For instance, the combination of a preferred feature with a particularly preferred feature or of a feature which has not been further characterized with a particularly preferred feature etc. is also implicitly comprehended even when this combination is not mentioned explicitly.

Exemplary embodiments of the present invention, which do not limit the present invention, are recited hereinbelow. More particularly, the present invention also comprehends those embodiments which result from the hereinbelow recited dependency references and hence combinations.

1. A polyester polyol (P1) obtainable or obtained by esterification of components (i) to (v)
  (i) 10 to 70 mol % of at least one compound from the group consisting of terephthalic acid (TPA), dimethyl terephthalate (DMT), polyethylene terephthalate (PET), phthalic anhydride (PA), phthalic acid and isophthalic acid,
  (ii) 0.1 to 30 mol % of one or more fatty acids and/or fatty acid derivatives,
  (iii) 10 to 70 mol % of one or more aliphatic or cycloaliphatic diois having 2 to 18 carbon atoms or alkoxylates thereof,
  (iv) 5 to 70 mol % of a polyether polyol prepared by alkoxylating an aromatic starter molecule having a functionality of not less than 2,
  (v) 0 to 70 mol % of a tri- or polyol other than component (iv),
  all based on the total amount of components (i) to (v), wherein the amounts used of components (i) to (v) add up to 100 mol %.

2. The polyester polyol (P1) according to embodiment 1 wherein said components (i) to (v) are used in the following amounts:
  component (i) in an amount from 25 to 40 mol %,
  component (ii) in an amount from 8 to 14 mol %,
  component (iii) in an amount from 25 to 55 mol %,
  component (iv) in an amount from 12 to 18 mol %, and
  component (v) in an amount from 0 to 18 mol %,
  all based on the total amount of components (i) to (v), wherein the amounts used of components (i) to (v) add up to 100 mol %.

3. The polyester polyol (P1) according to embodiment 1 or 2 wherein said component (i is selected from the group consisting of terephthalic acid and dimethyl terephthalate (DMT).

4. The polyester polyol (P1) according to any of embodiments 1 to 3 wherein said component (ii) is selected from the group consisting of oleic acid, soya oil, rapeseed oil and tallow.
5. The polyester polyol (P1) according to any of embodiments 1 to 4 wherein said component (iii) is selected from the group consisting of diethylene glycol (DEG) and monoethylene glycol (MEG).
6. The polyester polyol (P1) according to any of embodiments 1 to 5 wherein said component (iv) is obtainable or obtained by ethoxyiating an aromatic polyol having a functionality of greater than 2.
7. The polyester polyol (P1) according to any of embodiments 1 to 6 wherein said component (iv) is obtainable or obtained by ethoxylating a composition consisting of tolyienediamine isomers and comprising not less than 90 wt % of tolyienediamine isomers having a vicinal position for the two amino groups.
8. The polyester polyol (P1) according to any of ernhndinnents 1 to 7 wherein said polyester polyol (P1) has a number average molecular weight in the range from 450 g/mol to 800 g/mol.
9. A process for producing rigid polyurethane foams or rigid polyisocyanurate foams which comprises the reaction of
   A) a component (A) comprising at least one compound selected from the group consisting of organic diisocyanates, modified organic diisocyanates, organic polyisocyanates and modified organic polyisocyanates, with
   B) a polyol component (PK) comprising
      (b1) at least one polyester polyol (P1) according to any of embodiments 1 to 8,
      (b2) at least one flame retardant,
      (b3) at least one blowing agent,
      (b4) at least one catalyst.
10. The process according to embodiment 9 wherein said polyol component (PK) comprises one or more of the following compounds:
    (b1.2) at least one polyester polyol (P2) other than said polyester polyol (P1),
    (b1.3) at least one compound selected from the group consisting of polyetherols (P3), compounds having two or more isocyanate-reactive groups, chain-extending agents and crosslinking agents,
    (b5) further auxiliaries and/or admixture agents.
11. The process according to embodiment 10 wherein the mass ratio of the sum total of polyesterols (P1) and (P2) to the sum total used of polyetherols (P3) is not less than 0.1.
12. The process according to embodiment 10 or 11 wherein said polyol component (PK) comprises no further polyester polyol (P2) in addition to said polyester polyol (P1).
13. The process according to any of embodiments 10 to 12 wherein the polyether polyol component of (b1.3) comprises polyethylene glycol only and no further polyether polyols are used.
14. The process according to any of embodiments 9 to 13 wherein the flame retardant component (b2) comprises tris(2-chloropropyl) phosphate (TCPP) only and no further flame retardants are used.
15. The process according to any of embodiments 9 to 14 wherein the blowing agent component (b5) comprises chemical and physical blowing agents, wherein the chemical blowing agent is selected from the group consisting of water, formic acid-water mixtures and formic acid and the physical blowing agent consists of one or more pentane isomers.
16. A polyol component (PK) comprising
    (b1.1) 50 to 90 wt % of polyester polyol (P1) according to any of embodiments 1 to 8,
    (b1.2) 0 to 20 wt % of at least one polyester polyol (P2),
    (b1.3) 2 to 9 wt % of at least one polyether polyol (P3),
    (b2) 5 to 30 wt % of at least one flame retardant,
    (b3) 1 to 30 wt % of at least one blowing agent,
    (b4) 0.5 to 10 wt % of at least one catalyst, and
    (b5) 0.5 to 20 wt % of further auxiliary and admixture agents, all based on the total weight of polyol component (PK), wherein the weight percentages add up to 100 wt %, and wherein the mass ratio of the sum total of polyesterols (P1) and (P2) to the sum total used of polyetherols (P3) is not less than 2.
17. A rigid polyurethane or polyisocyanurate foam obtainable or obtained by a process according to any of embodiments 9 to 15.
18. The method of using a polyester polyol (P1) according to any of embodiments 1 to 8 or a polyol component (PK) according to embodiment 16 in the manufacture of rigid polyurethane foams or rigid polyisocyanurate foams.

The examples which follow serve to illustrate the invention, but are not in any way limiting with regard to the subject matter of the present invention.

EXAMPLES

1. The following polyols and catalyst mixtures were used:
1.1 Polyesterol 1 (comparative sample):
   Esterification product of terephthalic acid (32 5 mol %), oleic acid (9.0 mol %), diethylene glycol (26.0 mol %) and a polyether (32.5 mol %) based on glycerol and ethylene oxide having an OH functionality of 3 and a hydroxyl number of 705 mg KOH/g. The polyesterol has a hydroxyl functionality of 2.9 and a hydroxyl number of 250 mg KOH/g.
1.2 Polyesterol 2 (in Accordance with the Present Invention):
   Esterification product of terephthalic acid (30.3 mol %), oleic acid (10.6 mol %), diethylene glycol (40.9 mol %) and a polyether (18.2 mol %) based nn tolylenediamine (TDA) comprising 98 wt % of isomers having a vicinal position of the two amino groups relative to each other and ethylene oxide having an OH functionality of 4 and a hydroxyl number of 452 mg KOH/g. The polyesterol has a hydroxyl functionality of 2.9 and a hydroxyl number of 241 mg KOH/g.
1.3 Polyether Polyol 1:
   Polyetherol formed from ethoxylated ethylene glycol and having a hydroxyl functionality of 2 and a hydroxyl number of 190 mg KOH/g.
1.4 Catalyst Mixture 1:
   47 wt % of potassium acetate, 50.15 wt % of monoethylene glycol and 2.85 wt % of water.
1.5 Catalyst Mixture 2:
   70 wt % of bis(2-dimethylaminoethyl) ether and 30 wt % of dipropylene glycol.
2. Comparative Example 1
   A polyol component was prepared from 80.0 parts by weight of "polyesterol 1", 8.0 parts by weight of "polyether polyol 1", 10.0 parts by weight of tris-2-ehloroisopropyl phosphate (TCPP) and 2.0 parts by weight of a silicone-containing foam stabilizer (Tegostab® B 8443 from Goldschmidt) by mixing.
   The polyol component was phase stable at 20° C. It was reacted with 200 parts by weight of a polymer MDI having an NCO content of 31.5 wt % (Lupranat° M50 from BASF SE) in the presence of 8 parts by weight of n-pentane (8.0 parts by weight), 2 parts by weight of "catalyst mixture 1", by varying "catalyst mixture 2" and water such that the fiber time was 42±1 seconds and the resulting foam had a density of 39.0±1 kg/m$^3$.

3. Example 1

A polyol component was prepared from 80.0 parts by weight of "polyesterol 2", 8.0 parts by weight of "polyether polyol 1", 10.0 parts by weight of tris-2-chloroisopropyl phosphate (TCPP) and 2.0 parts by weight of a silicone-containing foam stabilizer (Tegostab® B 8443 from Goldschmidt) by mixing.

The polyol component was phase stable at 20° C. It was reacted with 200 parts by weight of a polymer MDI having an NCO content of 31.5 wt % (Lupranat® M50 from BASF SE) in the presence of 8 parts by weight of n-pentane (8.0 parts by weight), 2 parts by weight of "catalyst mixture 1", by varying "catalyst mixture 2" and water such that the fiber time was 42±1 seconds and the resulting beaker foam had a density of 39.0±1 kg/m$^3$.

4. Measurement of Average and Peak Rates of Heat Release by Cone Calorimetry

The test specimens used for cone calorimetry were cut out of the slab foams at identical places. The reaction mixture used to produce the slab foams led in beaker foams to the abovementioned fiber times of 42±1 seconds and the beaker foam densities of 39.0±1 kd/m$^3$ and was reacted in identical amounts [±5 g] in a slab mold 25 cm in length, 15 cm in width and 21 cm in height.

Cone calorimetry was used to determine heat release and mass loss similarly to ISO 5660-1 Part 1. For this, the test specimens were tested in horizontal alignment using a radiation intensity of 50 kW/m$^2$. The results are summarized in table 1.

TABLE 1

| | | | Comparative Example 1 | Example 1 |
|---|---|---|---|---|
| polyester polyol 1 | | parts by wt | 80 | |
| polyester polyol 2 | | parts by wt | | 80 |
| tris-2-chlorisopropyl phosphate | | parts by wt | 10 | 10 |
| polyether polyol 1 | | parts by wt | 8 | 8 |
| Tegostab ® B 8443 | | parts by wt | 2 | 2 |
| Lupranat ® M50 | | parts by wt | 200 | 200 |
| catalyst mixture 1 | | parts by wt | 2 | 2 |
| catalyst mixture 2 | | parts by wt | 2 | 1.8 |
| water | | parts by wt | 2 | 1.8 |
| n-pentane | | parts by wt | 8 | 8 |
| beaker density | | kg/m$^3$ | 38.9 | 38.8 |
| fiber time | | s | 42 | 41 |
| ignition | | s | 3 | 3 |
| average heat release | 60 s after ignition | kW/m$^2$ | 75.2 | 67.9 |
| | 180 s after ignition | kW/m$^2$ | 59.5 | 46.8 |
| | 300 s after ignition | kW/m$^2$ | 47.7 | 39.1 |
| | 360 s after ignition | kW/m$^2$ | 44.2 | 35.6 |
| PRHR | after ignition | MJ/m$^2$ | 74.6 | 71.7 |

Both foams ignite 3 seconds after the start of the test. Surprisingly, the foam of Example 1 consistently has a significantly lower average rate of heat release than the foam of Comparative Example 1 after each of 1, 3, 5 and 6 minutes.

Similarly, the peak rate of heat release [PRHR] in Example 1 is lower than in Comparative Example 1.

Not only the lower average rates of heat releas but also the lower PRHR demonstrate that the foam of Example 1 is distinctly superior to the foam of Comparative Example 1 in the event of a fire.

We claim:

1. A polyester polyol (P1) obtained by esterification of components (i) to (v):
   (i) 10 to 70 mol % of at least one compound from the group consisting of terephthalic acid (TPA), dimethyl terephthalate (DMT), polyethylene terephthalate (PET), phthalic anhydride (PA), phthalic acid and isophthalic acid,
   (ii) 0.1 to 30 mol % of one or more fatty acids and/or fatty acid derivatives,
   (iii) 10 to 70 mol % of one or more aliphatic or cycloaliphatic diols having 2 to 18 carbon atoms or alkoxylates thereof,
   (iv) 5 to 70 mol % of a polyether polyol prepared by alkoxylating an aromatic starter molecule having a functionality of not less than 2,
   (v) 0 to 70 mol % of a tri- or polyol other than component (iv),
   all based on a total amount of components (i) to (v), wherein the amounts used of components (i) to (v) add up to 100 mol %.

2. The polyester polyol (P1) according to claim 1, wherein said components (i) to (v) are used in the following amounts:
   component (i) in an amount from 25 to 40 mol %,
   component (ii) in an amount from 8 to 14 mol %,
   component (iii) in an amount from 25 to 55 mol %,
   component (iv) in an amount from 12 to 18 mol %, and
   component (v) in an amount from 0 to 18 mol %,
   all based on the total amount of components (i) to (v), wherein the amounts used of components (i) to (v) add up to 100 mol %.

3. The polyester polyol (P1) according to claim 1, wherein said component (i) is selected from the group consisting of terephthalic acid and dimethyl terephthalate (DMT).

4. The polyester polyol (P1) according to claim 1, wherein said component (ii) is selected from the group consisting of oleic acid, soya oil, rapeseed oil and tallow.

5. The polyester polyol (P1) according to claim 1, wherein said component (iii) is selected from the group consisting of diethylene glycol (DEG) and monoethylene glycol (MEG).

6. The polyester polyol (P1) according to claim 1, wherein said component (iv) is obtained by ethoxylating an aromatic polyol having a functionality of greater than 2.

7. The polyester polyol (P1) according to claim 1, wherein said component (iv) is obtained by ethoxylating a composition consisting of tolylenediamine isomers and comprising not less than 90 wt % of tolylenediamine isomers having a vicinal position for the two amino groups.

8. The polyester polyol (P1) according to claim 1, wherein said polyester polyol (P1) has a number average molecular weight in the range from 450 g/mol to 800 g/mol.

9. A process for producing rigid polyurethane foams or rigid polyisocyanurate foams, the process comprising:
   reacting
   A) a component (A) comprising at least one compound selected from the group consisting of organic diisocyanates, modified organic diisocyanates, organic polyisocyanates and modified organic polyisocyanates, with B) a polyol component (PK), comprising:
- (b1.1) at least one polyester polyol (P1) according to claim 1,
- (b2) at least one flame retardant,
- (b3) at least one blowing agent, and
- (b4) at least one catalyst.

10. The process according to claim 9, wherein said polyol component (PK) further comprises one or more of the following compounds:
- (b1.2) at least one polyester polyol (P2) other than said polyester polyol (P1),
- (b1.3) at least one compound selected from the group consisting of polyether polyols (P3), compounds having two or more isocyanate-reactive groups, chain-extending agents and crosslinking agents,
- (b5) further auxiliaries and/or admixture agents.

11. The process according to claim 10, wherein a mass ratio of a sum total of polyester polyols (P1) and (P2) to a sum total used of polyether polyols (P3) is not less than 0.1.

12. The process according to claim 10, wherein said polyol component (PK) comprises no further polyester polyol (P2) in addition to said polyester polyol (P1).

13. The process according to claim 10, wherein the polyether polyol component of (b1.3) comprises polyethylene glycol only and no further polyether polyols are used.

14. The process according to claim 9, wherein the flame retardant component (b2) comprises tris(2-chloropropyl) phosphate (TCPP) only and no further flame retardants are used.

15. The process according to claim 9, wherein the blowing agent (b3) comprises chemical and physical blowing agents, wherein the chemical blowing agent is selected from the group consisting of water, formic acid-water mixtures and formic acid and the physical blowing agent consists of one or more pentane isomers.

16. A polyol component (PK), comprising:
- (b1.1) 50 to 90 wt % of polyester polyol (P1) according to claims 1,
- (b1.2) 0 to 20 wt % of at least one polyester polyol (P2),
- (b1.3) 2 to 9 wt % of at least one polyether polyol (P3),
- (b2) 5 to 30 wt % of at least one flame retardant,
- (b3) 1 to 30 wt % of at least one blowing agent,
- (b4) 0.5 to 10 wt % of at least one catalyst, and
- (b5) 0.5 to 20 wt % of further auxiliary and admixture agents,
- all based on a total weight of polyol component (PK), wherein the weight percentages add up to 100 wt %, and wherein a mass ratio of a sum total of polyester polyols (P1) and (P2) to a sum total used of polyether polyols (P3) is not less than 2.

* * * * *

UNITED STATES PATENT AND TRADEMARK OFFICE
CERTIFICATE OF CORRECTION

| | |
|---|---|
| PATENT NO. | : 10,259,906 B2 |
| APPLICATION NO. | : 15/117960 |
| DATED | : April 16, 2019 |
| INVENTOR(S) | : Tobias Kaluschke et al. |

It is certified that error appears in the above-identified patent and that said Letters Patent is hereby corrected as shown below:

On the Title Page

On page 2, Column 1, item (56), other publications, Line 11, "Kuriststoff" should read -- Kunststoff --.

In the Specification

In Column 1, Line 37, "chain-extet ding" should read -- chain-extending --.

In Column 1, Line 46, "alkanediois" should read -- alkanediols --.

In Column 1, Line 48, "terephthaiate" should read -- terephthalate --.

In Column 1, Line 53, "DEA" should read -- DE-A --.

In Column 1, Line 61, "used," should read -- used. --.

In Column 2, Line 2, "poiyisocyanurate" should read -- polyisocyanurate --.

In Column 2, Line 24, "fro" should read -- from --.

In Column 2, Line 32, "dials" should read -- diols --.

In Column 2, Line 61, "he" should read -- the --.

In Column 2, Line 66, "(PI)," should read -- (P1), --.

In Column 3, Line 2, "(PI)" should read -- (P1) --.

In Column 3, Line 29, "polyol"," should read -- polyol" --.

Signed and Sealed this
Third Day of March, 2020

Andrei Iancu
*Director of the United States Patent and Trademark Office*

CERTIFICATE OF CORRECTION (continued)
U.S. Pat. No. 10,259,906 B2

In Column 3, Line 64, "hich" should read -- which --.

In Column 4, Line 14, "10D" should read -- 100 --.

In Column 4, Line 57, "herein" should read -- wherein --.

In Column 4, Lines 64-67 and Column 5, Lines 1-7, delete "(PET), phathalic - - - - - - - terephathalic acid." and insert the same at Column 4, Line 63, after "terephthalate".

In Column 5, Line 11, "fro" should read -- from --.

In Column 5, Line 12, "consistina" should read -- consisting --.

In Column 5, Line 14, "s" should read -- is --.

In Column 5, Line 29, ":-linolenic" should read -- α-linolenic --.

In Column 5, Line 51, "1,5-pentane" should read -- 1,5-pentanediol, --.

In Column 5, Lines 59-60, "nvention" should read -- invention --.

In Column 6, Line 34, "riaid" should read -- rigid --.

In Column 6, Line 41, "particlarly" should read -- particularly --.

In Column 7, Line 13, "ma" should read -- mg --.

In Column 7, Lines 21-22, "nvention" should read -- invention --.

In Column 7, Line 30, "tris" should read -- tri- --.

In Column 8, Line 62, "gIrnol" should read -- g/mol --.

In Column 9, Line 20, "riaid" should read -- rigid --.

In Column 9, Line 24, "oraanic" should read -- organic --.

In Column 9, Line 55, "molecule;" should read -- molecule, --.

In Column 10, Line 37, "(HXDI)" should read -- (HXDI), --.

In Column 10, Line 48, "nvention" should read -- invention --.

In Column 11, Line 19, "polyiunctional" should read -- polyfunctional --.

CERTIFICATE OF CORRECTION (continued)
U.S. Pat. No. 10,259,906 B2

In Column 11, Line 21, "Polyfunctionai" should read -- Polyfunctional --.

In Column 12, Lines 39-40, "paimitoleic" should read -- palmitoleic --.

In Column 12, Line 54, "polypi" should read -- polyol --.

In Column 13, Line 8, "8." should read -- 8, --.

In Column 13, Line 23, "N-mono-." should read -- N-mono-, --.

In Column 13, Line 29, after "2,4-" insert -- and --.

In Column 13, Line 34, "aikanolamines," should read -- alkanolamines, --.

In Column 13, Line 36, "diethanolamine." should read -- diethanolamine, --.

In Column 13, Line 46, "polyoxyethyiene" should read -- polyoxyethylene --.

In Column 14, Line 5, "poiyesterols" should read -- polyesterols --.

In Column 14, Line 21, "presen" should read -- present --.

In Column 14, Line 43, "araphite" should read -- graphite --.

In Column 14, Line 52, "temperature," should read -- temperature. --.

In Column 14, Line 63, "polypi" should read -- polyol --.

In Column 15, Line 25, "ith" should read -- with --.

In Column 15, Line 27, "ricino eic" should read -- ricinoleic --.

In Column 15, Line 60, "acid oraformioaoiU-mxsterrnixturo" should read -- acid-water mixture --.

In Column 16, Line 24, "bis(dimethylaminopropl)" should read -- bis(dimethylaminopropyl) --.

In Column 16, Line 62, "lsocyanurate " should read -- Isocyanurate --.

In Column 17, Line 2, "Polyurethane." should read -- Polyurethane, --.

In Column 17, Line 2, "Munich." should read -- Munich, --.

In Column 17, Line 21, "siloxone" should read -- siloxane --.

In Column 18, Line 2, "Hanser-Veriag," should read -- Hanser-Verlag, --.

CERTIFICATE OF CORRECTION (continued)
U.S. Pat. No. 10,259,906 B2

In Column 18, Line 5, "comprisind" should read -- comprising --.

In Column 20, Line 15, "th ethod" should read -- the method --.

In Column 20, Line 44, "diois" should read -- diols --.

In Column 20, Line 65, "(i" should read -- (i) --.

In Column 21, Line 11, "ethoxyiating" should read -- ethoxylating --.

In Column 21, Line 16, "tolyienediamine" should read -- tolylenediamine --.

In Column 21, Line 17, "tolyienediamine" should read -- tolylenediamine --.

In Column 21, Line 20, "8," should read -- 8. --.

In Column 21, Lines 20-21, "ernhndinnents" should read -- embodiments --.

In Column 21, Line 31, "(b1)" should read -- (b1.1) --.

In Column 22, Lines 23-24, "subjet" should read -- subject --.

In Column 22, Line 30, "(32 5" should read -- (32.5 --.

In Column 22, Line 41, "nn" should read -- on --.

In Column 22, Line 67, "(Lupranat°" should read -- (Lupranat® --.

In Column 23, Line 28, "kd/m$^3$" should read -- kg/m$^3$ --.

In Column 24, Line 3, "releas" should read -- release --.

In the Claims

In Column 26, Line 13, Claim 16, "claims" should read -- claim --.